Jan. 1, 1957 E. A. SLUSSER 2,776,422
RANGE TRACKING SYSTEM
Filed Nov. 29, 1945 2 Sheets-Sheet 1

INVENTOR
EUGENE A SLUSSER
BY M. O. Hayes
ATTORNEY

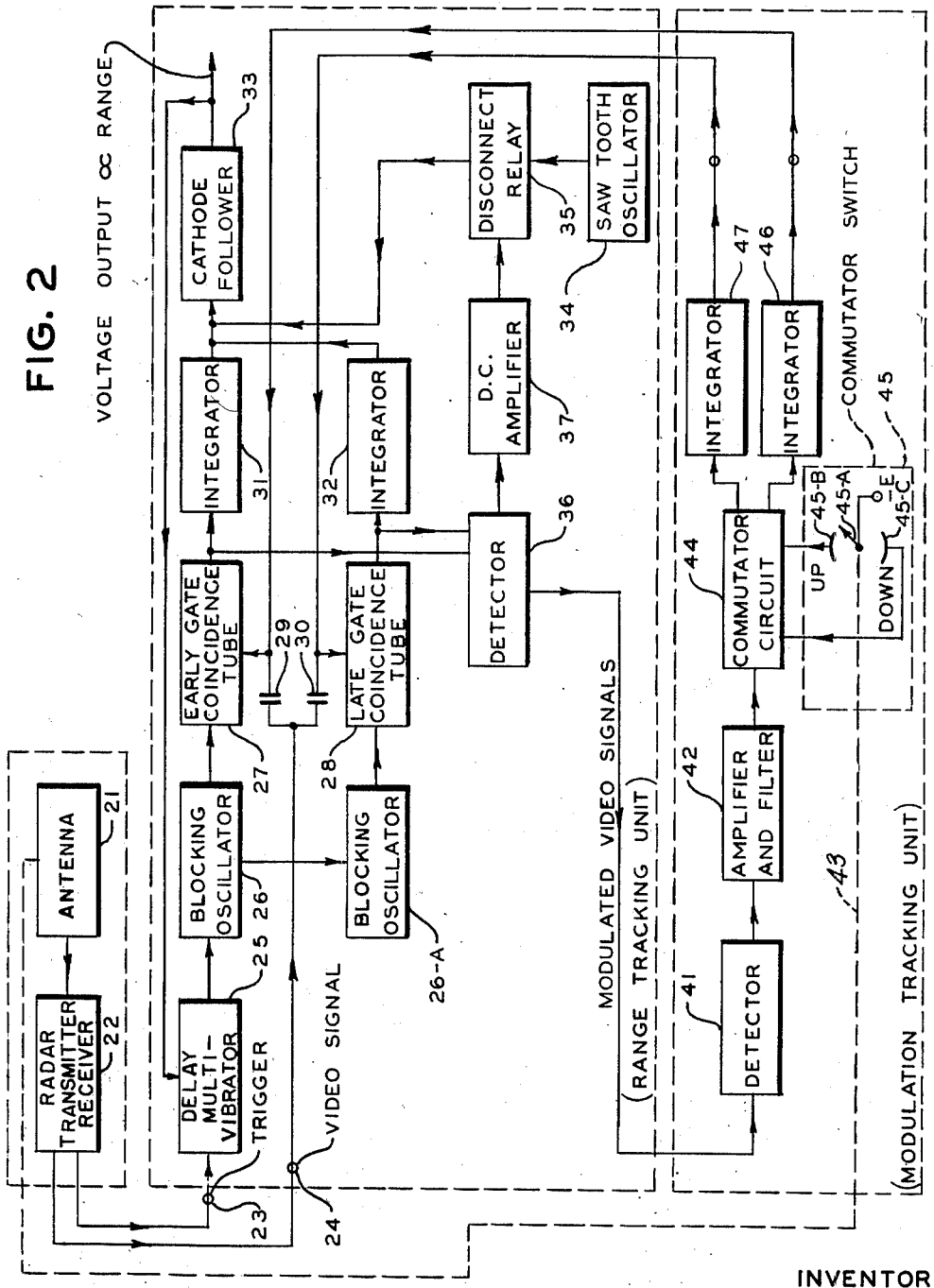

United States Patent Office 2,776,422
Patented Jan. 1, 1957

2,776,422

RANGE TRACKING SYSTEM

Eugene A. Slusser, Arlington Heights, Mass., assignor, by mesne assignments, to the United States of America as represented by the Secretary of the Navy Application November 29, 1945, Serial No. 631,737

13 Claims. (Cl. 343—7.3)

This invention relates to radar ranging circuits and in particular to radar ranging circuits which provide automatic range tracking of a given radar target in the presence of others.

One application of such circuits occurs in connection with radar tracking systems proposed for controlling airborne cannon and rocket fire. In using a typical system the pilot of the aircraft must track the target optically during an attack by keeping the reticle of an optical sight on the target under fire. The radar tracking system then supplies continuous range information to a computer which will cause the pilot's optical sight to be corrected in elevation so that the cannon or rocket projectiles will strike the target under attack.

A radar tracking system which performs the above function is described in a previous application entitled "Range Unit," Serial Number 604,270, filed July 10, 1945. Such a system is satisfactory for tracking an isolated radar target but is unable to select consistently a particular target from others in the same vicinity. This limitation can be appreciated by considering the following tactical situation. Assume that a pilot is guiding a radar equipped airplane toward several targets lying at the same bearing but at different ranges. Assume also that the pilot aims his optical sight, and thus the airplane, at a particular one of these targets, hereafter referred to as the desired target. Radar range tracking circuits of the type described in the reference cited above have no means for selecting automatically the radar echo occurring at the range of the target in the pilot's optical sight. This task must be performed by the pilot or a separate operator with the aid of some visual indication of the radar echoes received. It is evident that the difficulty of selecting the radar echo corresponding to the desired target increases with the number of radar echoes received by the radar equipment from other targets at different ranges. It is also evident that such a procedure hinders the pilot's efforts to maintain the optical sight on the target.

This invention includes provisions for automatically selecting from a number of targets the target lying on the pilot's optical line of sight. This is accomplished by a range tracking system in combination with a modulation tracking system which employs a modulation tracking circuit and a conically scanning paraboloid antenna. The antenna is also controlled in elevation and azimuth so that the central axis of the described cone, hereafter referred to as the boresight axis, is always parallel to the pilot's line of sight and consequently views the same target as does the pilot. As the antenna scans, the directional beam is swept in a cone around the boresight axis with the result that a given target which lies on the extension of this axis receives and reflects constant energy.

Targets at greater ranges receive and reflect maximum energy during the up portion of the scan while targets at lesser ranges receive and reflect maximum energy during the down portion of the scan. The modulation tracking circuit will detect this phenomenon as amplitude modulation of the radar echo being tracked by the range tracking system, and will then apply suitable correcting voltages to cause the range tracking system to select only the radar echo returned by the target lying on the boresight axis. The frequency of this amplitude modulation will depend on the scanning rate of the antenna and will therefore usually be in the low audio frequency range.

It is an object of this invention to provide an electrical system which enables a radar range tracking system to select a particular target in the presence of others.

It is also an object of this invention to provide an electrical system to develop voltages which indicate the range direction sense of a particular radar target with respect to the boresight axis of a conically scanning antenna.

These and other objects and features will be apparent upon consideration of the following detailed specification in connection with the accompanying diagrams where:

Fig. 2 is a block diagram of an automatic range tracking system in accordance with the principles of this invention.

Figure 1:
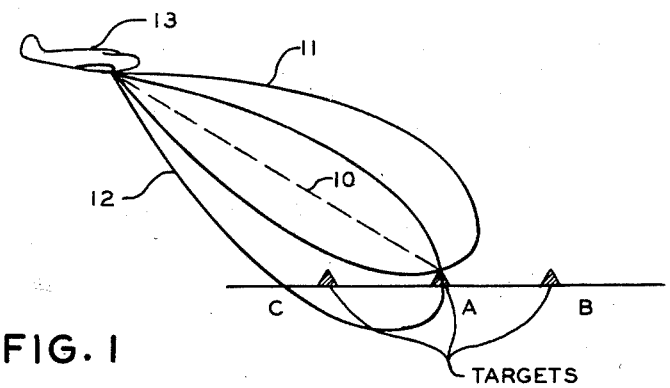
Fig. 1 is a pictorial view of aircraft useful in explaining the principles of the invention.

Referring now to Fig. 1 there is shown an aircraft 13 equipped with the elements of Fig. 2. A conically scanning antenna (not shown) attached to the aircraft causes the axis of a directional beam of high frequency energy to describe a cone in space, the antenna itself being at the vertex. The central axis of this cone, hereafter called the boresight axis 10, is aligned to be parallel with the pilot's optical line of sight (not shown). Two antenna lobes are shown, 11 corresponding to the pattern for maximum antenna elevation and 12 corresponding to the pattern for minimum antenna elevation. These two antenna positions will be referred to as the "up" quadrant and "down" quadrant respectively. Radar energy is being reflected from the three targets A, B, and C. The energy from target B is a maximum when the antenna is emitting a beam in the "up" quadrant, while energy from target C is a maximum in the "down" quadrant. The energy returning from target A remains constant during the scanning operation since that target lies along the boresight axis of the antenna. The net effect is that energy returning from targets B and C is modulated at a frequency determined by the antenna scanning speed, whereas energy returning from target A is unmodulated. This behavior of the radar echo signals is ultimately utilized by the modulation tracking circuit to discriminate between a target lying on the boresight axis and all others within the effective antenna field of view.

Considering now Fig. 2, it can be seen that the complete system represented there is composed of three major units set off by dotted lines: a radar transmitter-receiver and a conically scanning antenna; a range tracking unit; and a modulation tracking unit. The detailed operation of the component elements is as follows. A radar echo signal such as mentioned above passes from the conically scanning antenna 21 to a conventional pulse-type radar transmitter-receiver 22 where it is converted to a positive video signal. A synchronizing trigger is also derived from the transmitter-receiver 22 which occurs at the time of the radar transmitted pulse. These two signals are applied to input terminals 23 and 24 of a range tracking unit.

The particular range tracking unit represented in Fig. 2 is substantially similar to that described in the above identified application, consequently it is deemed unnecessary to analyze its operation here in detail. Moreover, only such elements of the range tracking unit have been included as are considered necessary for an understanding of the features of this invention. This range tracking unit employs a double gate method of range tracking.

The action of the range tracking unit circuits will now be described. A voltage sensitive precision delay multivibrator 25 activated by the trigger from the transmitter-receiver 22 displaces in time two narrow gate pulses generated by two blocking oscillators 26 and 26–A. These narrow gate pulses are displaced from one another by a narrow fixed interval so that the second gate pulse starts immediately after the first one stops. The two narrow gate pulses are applied positively to remove a negative bias from the suppressor grids of two pentode coincidence tubes 27 and 28. Also a positive video signal is supplied from the transmitter-receiver 22 to the control grids of tubes 27 and 28 through condensers 29 and 30. If there is coincidence between a video signal and the gate pulse applied to one of the coincidence tubes that tube will conduct heavily during the coincidence interval. If such a coincidence does not exist the tube will not conduct. If the video signal occurs midway between the two adjacent gates both coincidence tubes conduct. The resultant two pulses are inverted to make them positive and are then applied to the grids of two integrator tubes 31 and 32. Pulses on one grid cause an increase in the net integrator circuit output voltage and on the other a decrease. Since the widths of the resulant pulses on the respective plates of the coincidence tubes 27 and 28 and hence the widths on the two respective integrator circuit grids are proportional to the overlap between the video signal and each gate the output potential rises or falls depending on the relative location of the video signal to the two adjacent gates. If most of the signal is during the early gate the potential drops but if most of the signal is during the late gate the potential rises. If the signal is equally divided between the two gates the potential will not change. If the signal level momentarily falls to zero the potential likewise will not change because the change on the integrator condenser (not shown) cannot leak off. Thus when a signal is being properly tracked it will appear midway between the two gates.

The net output voltage of the integrators 31 and 32 controls the operation of a cathode follower tube 33, whose corresponding output voltage is suitably divided and fed back to the grid of the delay multivibrator 25. Since the gate width of the delay multivibrator is a linear function of grid bias, the voltage necessary to hold the multivibrator gate at a width which centers the tracking gates on the signal is used as a measure of the range of the target being tracked. This so called range voltage can then be used to operate a computer or other fire control device.

If the tracking gates mentioned above do not lock on a video signal an automatic range search feature of this range tracking unit causes them to sweep out and back over the effective range of the associated radar transmitter-receiver until a video signal is found. This function is accomplished by automatically connecting the output of a saw tooth oscillator 34 through a disconnect relay 35 to the input of the cathode follower 33 and hence to the grid of the delay multivibrator. When coincidence signals are available at the outputs of the coincidence tubes they are fed to the two grids of a dual infinite impedance type detector 36. The output of this detector is applied through a direct current amplifier 37 to activate the disconnect relay 35 and thus remove the application of the saw tooth voltage to the input of the cathode follower.

It should now be realized that the video signals arriving at the coincidence tubes 27 and 28 may be amplitude modulated at a low audio frequency during the conical scan of the antenna 21 according to the action previously described provided the reflecting target does not lie on the boresight axis.

This effect will not however appreciably alter the operation of the circuits analyzed thus far. The output of the detector 36 is also connected to the infinite impedance type detector 41 in the modulation tracking unit. The function of the latter detector is to select the fundamental modulation frequency component of the video signals introduced by the antenna scanning motion.

The modulation signal output of detector 41 is passed through amplifier 42 and then applied to a commutator circuit 44. The function of the commutator circuit is to produce two voltage signals which compare the phase of the modulation signal applied with the elevation of the antenna 21. This is accomplished by two triode tubes whose cathodes are connected alternately to a source of negative potential by means of a commutator switch 45. The moving arm 45a of this switch is synchronized as indicated by dotted line 43 to rotate at the same rate as the beam of the conically scanning antenna. Contact to one commutator segment 45b is made when the antenna beam has its maximum elevation and contact to the other commutator segment 45c is made when the antenna beam has its minimum elevation. These two positions correspond to the two lobes entitled "up" and "down" of Fig. 1. The action of the commutator switch is such that the aforementioned two triode tubes, hereafter referred to as commutator tubes, alternately conduct at a rate which is twice the frequency of the modulation signal applied to their grids. As a result one commutator tube will conduct more or less current than the other depending upon the phase relation between the modulation signal and the commutator switching action. Thus two bias voltages of opposite relative polarities are obtained which are then separately applied through integrators 46 and 47 to the control grids of the early and late gate coincidence tubes 27 and 28 respectively.

These bias voltages are of such magnitudes and polarities that one will tend to cut off one coincidence tube while the other will maintain the other coincidence tube in conduction.

The action of the system as a whole will now be described. Assume that the range tracking unit starts to track target B of Fig. 1. Since this target does not lie on the boresight axis the video signal coinciding with the tracking gates will be amplitude modulated. This modulation will be detected by the modulation tracking unit and compared with the rotation of the antenna beam. The energy returned from target B will be a maximum when the antenna beam is in the "up" position. The bias voltages fed back to the coincidence tubes will then act to cut off the late gate coincidence tube 28 and keep the early gate coincidence tube 27 conducting. By the previously described action of the early gate coincidence tube on the integrator 31 the delay multivibrator 25 will shorten its output gate and thus cause the two tracking gates to move inward in range away from target B and toward the desired target A which lies on the boresight axis. Similarly, if the tracking gates had initially locked on target C, which is too close in range, the energy returned from target C would have been a maximum when the antenna beam was in the "down" position and the modulation tracking unit would have cut off the early gate coincidence tube 27, causing the tracking gates to move outward in range toward the desired target A.

Thus the modulation tracking unit permits the range tracking gates to select only the target which is intersected by the boresight axis of the radar antenna.

Figure 3:
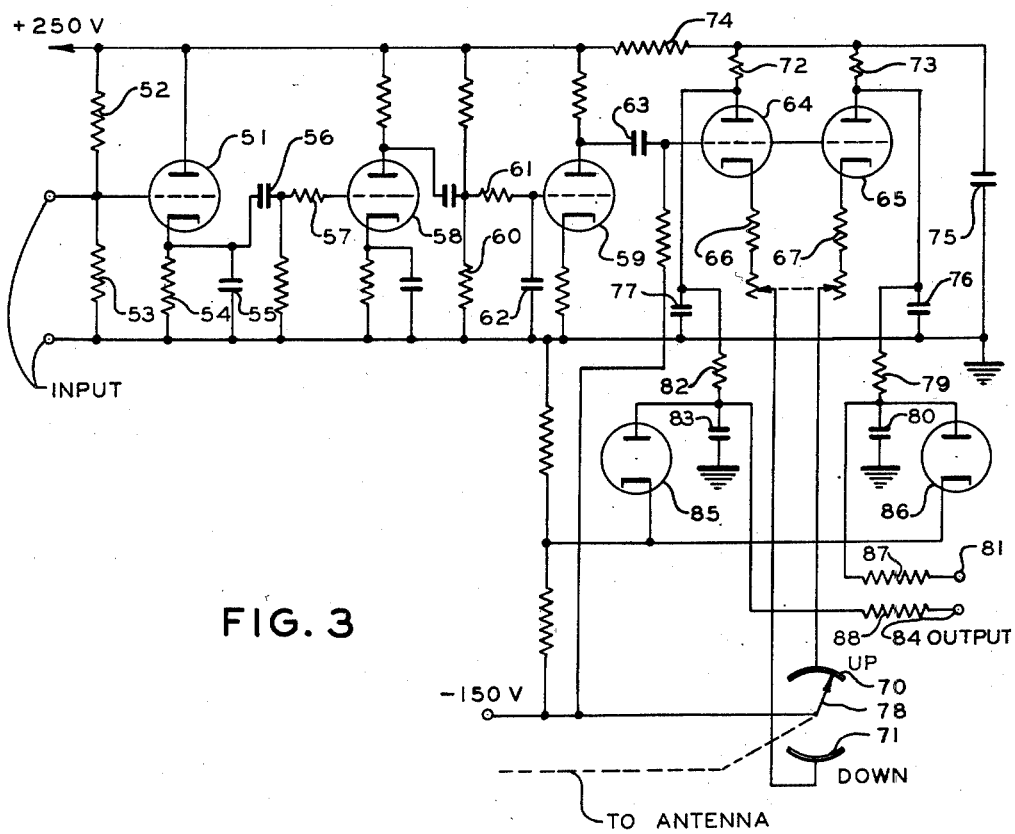
Fig. 3 is a circuit diagram of certain blocks of Fig. 2.

A more detailed circuit diagram of an embodiment of a modulation tracking unit appears in Fig. 3. The tube 51 has applied to its grid the gated video pulses from the range unit and acts as a detector which detects the audio modulation resulting from the conical scanning of the antenna. Resistors 52 and 53 provide bias for the grid of tube 51, while resistor 54 and condenser 55 comprise the load circuit, condenser 55 serving to bypass unwanted high frequency components. The detected audio modulation is then coupled through condenser 56 and the current limiting resistor 57 to the grid of the amplifier tube 58. The output of this stage is fed to the grid of the amplifier tube 59 through a low pass filter consisting of resistors 60 and 61 and condenser 62 which further remove unwanted high frequency components. The output of tube 59 is then coupled through condenser 63 to the grids of both commutator tubes 64 and 65. The grids of these commutator tubes are returned to a negative voltage as shown. The cathodes are connected respectively through resistors 66 and 67 to the commutator segments shown schematically at 70 and 71. The plates of tubes 64 and 65 are connected respectively through resistors 72 and 73 to a source of positive voltage as shown, resistor 74 dropping the main D. C. supply voltage to the proper value. Condensers 75, 76 and 77 by-pass undesirable high frequency voltage variations and thus serve to improve the stability of the circuit. The action of the commutator tubes 64 and 65 will now be described. If the cathode of one commutator tube is connected through the rotating arm 78 of the commutator switch to the source of negative potential as shown, that tube will conduct current by an amount which depends on the instantaneous value of the amplified modulation signal applied to its grid. The cathode of the other tube at this time will be left "floating," hence this latter tube cannot conduct. Thus the commutator switch gates tubes 64 and 65 according to the position of the antenna beam. Assume again the situation of the range tracking unit tracking target B of Fig. 1. Since the modulation signal applied to the grids of tubes 64 and 65 has the same phase as the modulation of the radar echo from target B it will be at a positive maximum when the antenna beam is in the up position and at a negative maximum when the antenna beam is in the down position. Thus tube 65 conducts more heavily during the up position of the cycle than tube 64 conducts during the down portion of the cycle than tube 64 conducts during the down portion of the cycle. Consequently the voltage drop at the plate of tube 65 will be greater than that at the plate of tube 64. The negative voltage signal from tube 65 is fed through an integrator circuit comprising resistor 79 and condenser 80 to resistor 87 connected to output terminal 81. The plate of tube 64 is similarly connected through the integrator circuit comprising resistor 82 and condenser 83 to resistor 88 connected to output terminal 84. Since the terminals 81 and 84 are connected respectively to the grids of the late gate and early gate coincidence tubes of Fig. 2 it is evident that the late gate tube 28 will be cut off, ultimately causing the tracking gates to leave target B and move inward in range toward the desired target A. Resistors 87 and 88 prevent the video signals applied to the grids of the coincidence tubes from disturbing the action of the modulation tracking circuit. A similar analysis can be made for the case of the range tracking unit tracking target C. In this situation the condtions are reversed, tube 64 sending a negative voltage signal to the early gate coincidence tube 27. When the range tracking unit tracks target A, lying on the boresight axis, no modulation signal is received by the commutator tubes and thus neither of the coincidence tubes 27 and 28 is cut off.

The integrators 46 and 47 of Fig. 2 are the modulation tracking time constant circuits and serve to extend the duration of the voltage signal derived from the plates of tubes 64 and 65 in order to maintain control of the coincidence tubes 27 and 28 over a complete modulation cycle and also to keep the tracking gates moving away from the unwanted video signal when the amplitude of the modulation signal starts decreasing. The diodes 85 and 86 serve as bias restorers to clamp the terminals 81 and 84 to a small negative voltage between voltage signals and thus prevent the coincidence tube grids from going positive with respect to the cathodes.

The action of the modulation tracking circuit therefore is to permit the range tracking unit to track only a target lying on the boresight axis of the conically scanning antenna. Consequently this invention enables a radar range tracking system to select for consideration a particular target from a number of others in the same vicinity.

The invention described in the foregoing specification need not be limited to the details shown, which are considered to be illustrative of one form the invention may take.

I claim:

1. In airborne object locating and distance measuring system of the radio pulse-echo type, in combination, a directional antenna, means to drive said antenna in a conical scanning motion about a selected axis, means for producing an output signal in response to the amplitude modulation of echo pulses reflected from objects lying at an angle to said axis, a circuit for producing electrical signals in response to the relation between the phase of said output signal and the scanning position of said antenna, range tracking unit having a generator of two consecutive gate pulses, means for periodically scanning said two consecutive gate pulses over the range of said distance measuring system and means for automatically discontinuing gate pulse scanning upon coincidence in time of said gate pulses and an echo signal detected by said system, and means applying said electrical signals to said range tracking unit to move the range position of said gate pulses away from time coincidence with echo signal pulses modulated by said antenna scanning, whereby said range tracking unit responds only to echo pulses from an object lying on said axis.

2. In airborne object locating and distance measuring system of the radio pulse-echo type, in combination, a directional antenna, means to drive said antenna in a conical scanning motion about a selected axis, a detector for producing an output signal in response to the amplitude modulation of echo pulses reflected from objects lying at an angle to said axis, an amplifier for amplifying said output signal, a commutator circuit having its input connected to said amplifier, a circuit for controlling the operation of said commutator circuit in accordance with the scanning position of said antenna, a range tracking unit adapted to produce two consecutive gate pulses, means for periodically varying the time of occurrence of said gate pulses over the range of said system and means for automatically discontinuing said periodic variation upon time coincidence of said gate pulses and an echo signal pulse detected by said systems, and means applying the output of said commutator circuit to change the time of occurrence of said gate pulses away from time coincidence with echo signal pulses modulated by said antenna scanning and in accordance with the scanning position of said antenna.

3. In airborne object locating and distance measuring system of the radio pulse-echo type, in combination, a directional antenna, means to drive said antenna in a conical scanning motion about a selected axis, a detector for producing an output signal in response to the amplitude modulation of echo pulses reflected from objects lying at an angle to said axis, an amplifier for amplifying said output signal, a commutator circuit with two output voltages having its input connected to said amplifier, a voltage source, a commutator switch for applying a bias voltage from said source to said commutator circuit to control said output voltages in accordance with the scanning motion of said antenna, integrating circuits for averaging the voltage amplitude at said commutator circuit outputs, a range tracking unit adapted to present two consecutive gate pulses, and means for periodically varying the time of occurrence of said gate pulses over the range of said system, means for automatically discontinuing said periodic variation upon time coincidence of said gate pulses and an echo signal pulse detected by said systems and means applying the output of said commutator circuit to change the time of occurrence to said gate pulses away from time coincidence with echo signal pulses modulated by said antenna scanning in accordance with the scanning position of said antenna.

4. In airborne object locating and distance measuring system of the radio pulse-echo type having an automatic range tracking unit, in combination, a directional antenna, means to drive said antenna in a conical scanning motion about a selected axis, a detector responsive to the amplitude modulation of echo pulses reflected from objects lying at an angle to said axis for producing an output voltage wave whose instantaneous amplitude corresponds to the modulation envelope of said echo pulses, an amplifier and filter for amplifying said voltage wave at the scanning frequency of said antenna, a commutator circuit including two normally non-conducting switching tubes having their inputs connected to said amplifier and filter, a source of voltage sufficient in amplitude to bias said tubes to conduction, a commutator switch alternately connecting said voltage source to said tubes in accordance with the vertical scanning position of said antenna, integrators connected to the outputs of each of said tubes for averaging the output potentials of said tubes, a range tracking unit having a generator of two consecutive gate pulses, means for periodically scanning said two consecutive gate pulses over the range of said radio detection system, means for automatically discontinuing said gate pulse scanning upon coincidence in time of said gate pulses and an echo signal detected by said system, and means applying said integrated potentials to bias said generator to change the time of occurrence of said gate pulses away from time coincidence with echo signal pulses modulated by said antenna scan in accordance with the scanning position of said antenna.

5. In an airborne system of fire control of the type in which a radio pulse-echo range tracking unit of the voltage sensitive double gate type employing dual coincidence circuits corrects the elevation of a computer controlled optical sight for target range, apparatus comprising, a conical scanning directional antenna adapted to scan about the line of sight of said optical sight, means to derive an output voltage in response to the amplitude modulation of echo pulses reflected from objects lying within the scanning cone of said antenna, and means for applying said output voltage to bias said range tracking unit coincidence circuits to track only unmodulated echo pulses.

6. In an airborne system of fire control of the type in which a radio pulse-echo range tracking unit of the voltage sensitive double gate type employing dual coincidence circuits corrects the elevation of a computer controlled optical sight for target range, apparatus comprising a directional antenna, means to drive said antenna in a conical scanning motion about an axis parallel to the line of sight of said optical sight, a detector responsive to amplitude modulated echo pulses reflected from objects lying at an angle to said line of sight for deriving an output voltage, and means for applying said output voltage to bias said range tracking unit coincidence circuits, whereby said range tracking unit is responsive solely to unmodulated echo pulses reflected from a target lying on said line of sight.

7. In an airborne system of fire control of the type in which a radio pulse-echo range tracking unit of the voltage sensitive double gate type employing dual coincidence circuits corrects the elevation of a computer controlled optical sight for target range, apparatus comprising a directional antenna, means to drive said antenna in a conical scanning motion about an axis positioned parallel to the line of sight of said optical sight, a detector responsive to amplitude modulated echo pulses reflected from objects lying within the scanning cone of said antenna and at an angle to said line of sight, a commutator circuit responsive to the output of said detector and to the scanning position of said antenna for deriving output voltages dependent upon the direction from which said echo pulses were received with respect to said line of sight, and means for applying said output voltages to bias said radio range tracking unit coincidence circuits to respond solely to unmodulated echo pulses.

8. In an airborne system of fire control of the type in which a radio pulse echo range tracking unit corrects the elevation of a computor controlled optical sight for target range, apparatus comprising, a conical scanning directional antenna adapted to scan about the line of sight of said optical sight, means to derive an output control voltage in response to the amplitude modulation of echo pulses reflected from objects lying within the scanning cone of said antenna and at an angle to said line of sight, an automatic range tracking circuit including a generator of double consecutive gate pulses at a time determined by the magnitude of a voltage applied to said generator, a saw tooth wave generator, means applying the output of said saw tooth wave generator to said double consecutive gate generator for varying the time of generation of said double gate pulses, early and late coincidence circuits responsive to the simultaneous occurrence of consecutive double gate pulses respectively and a detected target echo signal for disconnecting said saw tooth wave generator from said double gate pulse generator and means responsive to the relative coincidence of said target echo signal with said gate pulses in said early and late coincidence circuits to apply operating voltages to said double gate pulses generator to maintain said early and late coincidence circuits in equally coincident relationship with said target echo signal, and means applying said output control voltage to bias said coincidence circuits to move the double gate pulses away from time coincidence with target echo signals modulated by said antenna scanning, whereby said range tracking unit is responsive solely to tracking only unmodulated target echo pulses.

9. In an airborne system of fire control of the type in which a radio pulse echo range tracking unit corrects the elevation of a computor controlled optical sight for target range, apparatus comprising, a conical scanning directional antenna adapted to scan about the line of sight of said optical sight, means to derive an output voltage in response to the amplitude modulation of echo pulses reflected from object lying within the scanning cone of said antenna and at an angle to said line of sight, an automatic range tracking circuit including a generator of double consecutive gate pulses at a time determined by the magnitude of a voltage applied to said generator, means for varying periodically the time of generation of said double gate pulses, means responsive to the simultaneous occurrence of said double gate pulses and a detected target echo signal for stopping the periodic variation of said double gate pulse generator and means responsive to the relative overlapping of said target echo signal and each of said gate pulses to apply operating voltages to said double gate pulses generator to maintain said double gate pulses in equally overlapping relationship with said target echo signal, and means applying said output voltage to bias said double gate generator to move the double gate pulses away from time coincidence with target echo signals modulated by said antenna scanning, whereby said range tracking unit is responsive solely to tracking only unmodulated target echo pulses.

10. In an airborne system of fire control of the type in which a radio pulse echo range tracking unit corrects the elevation of a computor controlled optical sight for target range, apparatus comprising, a conical scanning directional antenna adapted to scan about the line of sight of said optical sight, means to derive an output control voltage in response to the amplitude modulation of echo pulses reflected from objects lying within the scanning cone of said antenna and at an angle to said line of sight, an automatic range tracking circuit including a generator of double consecutive gate pulses at a time determined by the magnitude of a voltage applied to said generator, a saw tooth wave generator, means applying the output of said saw tooth wave generator to said double consecutive gate generator for varying the time of generation of said double gate pulses, a pair of coincidence circuits each responsive to the simultaneous occurrence of one of said double gate pulses and a detected target echo signal for disconnecting said saw tooth wave generator from said double gate pulses generator and means responsive to the relative outputs of said coincidence circuits to apply operating voltages to said double gate pulses generator to maintain said double gate pulses in equally overlapping relationship with said target echo signal, and means applying said output control voltage to bias said coincidence circuits to move the double gate pulses away from time coincidence with target echo signals modulated by said antenna scanning, whereby said range tracking unit is responsive solely to tracking only unmodulated target echo pulses.

11. In airborne object locating and distance measuring system of the radio pulse-echo type, in combination, a directional antenna, means to drive said antenna in a conical scanning motion about a selected axis, a detector for producing an output signal in response to the amplitude modulation of echo pulses reflected from objects lying at an angle to said axis, an amplifier for amplifying said output signal, a commutator circuit with two output voltages having its input connected to said amplifier, a circuit for controlling the operation of said commutator circuit in accordance with the scanning motion of said antenna, an automatic range tracking circuit including a voltage sensitive precision delay multivibrator for producing a square wave whose time duration is dependent upon the potential applied as a bias thereto, means for producing two narrow gate pulses consecutive in time, the first of which occurrs at the trailing edge of said square wave, means for cyclically varying the potential applied to said multivibrator periodically to vary the time of occurrence of said gate pulses over the range of said detection system in the absence of pulse echo signals, means for stopping said periodic variation upon detection of a pulse echo signal, a pair of coincidence circuits to which said narrow gate pulses are fed respectively and to each of which pulse echo signals from said radio detection system are also fed so as to cause heavier conduction through the coincidence circuit wherein the gate pulse more nearly coincides in time, an integrator for increasing and decreasing a potential according to which of said coincidence circuits conducts heavier, an amplifier controlled by said integrator potential for producing an output voltage proportional to the time between the leading edge of said square wave and said pulse echo signal, a fraction of said output voltage being fed back to bias said multivibrator, whereby said gate pulses are caused to track said pulse echo signals and maintain said output voltage directly proportional to the range of said object reflecting said pulse echo signal, and means applying the output of said commutator circuit to bias said coincidence circuits in accordance with the scanning position of said antenna and the modulation of said echo pulses to cause heavier conduction through one of said coincidence circuits thereby to move said gate pulses away from time coincidence with amplitude modulated pulse echo signals.

12. In airborne object locating and distance measuring system of the radio pulse-echo type, in combination, a directional antenna, means to drive said antenna in a conical scanning motion about a selected axis, a detector for producing an output signal in response to the amplitude modulation of echo pulses reflected from objects lying at an angle to said axis, an amplifier for amplifying said output signal, a commutator circuit with two output voltages having its input connected to said amplifier, a voltage source, a commutator switch for applying a bias voltage from said source to said commutator circuit to control said output voltages in accordance with the scanning motion of said antenna, integrating circuits for averaging the voltage amplitude at said commutator circuit, an automatic range tracking circuit including a voltage sensitive precision delay multivibrator for producing a square wave whose time duration is dependent upon the potential applied as a bias thereto, means for producing two narrow gate pulses consecutive in time, the first of which occurs at the trailing edge of said square wave, means for cyclically varying the potential applied to said multivibrator periodically to sweep the time of occurrence of said gate pulses over the range of said detection system in the absence of pulse echo signals, means for stopping said periodic sweep upon detection of a pulse echo signal, a pair of coincidence circuits to which said narrow gate pulses are fed respectively and to each of which pulse echo signals from said radio detection system are also fed so as to cause heavier conduction through the coincidence circuit whenever the gate pulse more nearly coincides in time, an integrator for increasing and decreasing a potential according to which of said coincidence circuits conducts heavier, an amplifier controlled by said integrator potential for producing an output voltage proportional to the time between the leading edge of said square wave and said pulse echo signal, a fraction of said output voltage being fed back to bias said multivibrator, whereby said gate pulses are caused to track said pulse echo signals and maintain said output voltage directly proportional to the range of said object reflecting said pulse echo signal, and means applying the outputs of said integrating circuits to bias said coincidence circuits in accordance with the scanning position of said antenna and the amplitude modulation of said pulse echo signals to cause heavier conduction through one of said coincidence circuits thereby to move said gate pulses away from time coincidence with amplitude modulated pulse echo signals.

13. In airborne object locating and distance measuring system of the radio pulse-echo type, in combination, a directional antenna, means to drive said antenna in a conical scanning motion about a selected axis, a detector responsive to the amplitude modulation of echo pulses reflected from objects lying at an angle to said axis for producing an output voltage wave whose instantaneous amplitude corresponds to the modulation envelope of said echo pulses, an amplifier and filter for amplifying said voltage wave, a commutator circuit having two normally non-conducting switch tubes having their inputs connected to said amplifier, a voltage source sufficient in amplitude to bias said switch tubes to conduction, a commutator switch for applying alternately said voltage source to said tubes in accordance with the scanning motion of said antenna, integrating circuits for averaging the voltage amplitude at the outputs of each of said tubes, an automatic range tracking circuit including a voltage sensitive precision delay multivibrator for producing a square wave whose time duration is dependent upon the potential applied as a bias thereto, means for producing two narrow gate pulses consecutive in time, the first of which occurs at the trailing edge of said square wave, means for cyclically varying the potential applied to said multivibrator periodically to sweep the time of occurrence of said gate pulses over the range of said detection system in the absence of pulse-echo signals, means for stopping said periodic sweep upon detection of a pulse-echo signal, a pair of coincidence circuits to which said narrow gate pulses are fed respectively and to each of which pulse echo signals from said radio detection system are also fed so as to cause heavier conduction through the coincidence circuit wherein the gate pulse more nearly coincides in time, an integrator for increasing and decreasing a potential according to which of said coincidence circuits conducts heavier, and amplifier controlled by said integrator potential for producing an output voltage proportional to the time between the leading edge of said square wave and said pulse-echo signal, a fraction of said output voltage being fed back to bias said multivibrator, whereby said gate pulses are caused to track said pulse echo signals and maintain said output voltage directly proportional to the range of said object reflecting said pulse-echo signal, and means applying the outputs of said integrating circuits to bias said coincidence circuits in accordance with the scanning position of said antenna and the amplitude modulation envelope of said pulse echo signals to cause heavier conduction through one of said coincidence circuits thereby to change the time of occurrence of said gate pulses away from coincidence with amplitude modulated pulse-echo signals.

References Cited in the file of this patent

UNITED STATES PATENTS

| | | |
|---|---|---|
| 2,412,612 | Godet | Dec. 7, 1946 |
| 2,415,855 | Skellett | Feb. 18, 1947 |
| 2,455,265 | Norgaard | Nov. 30, 1948 |
| 2,467,208 | Hahn | Apr. 12, 1949 |
| 2,473,175 | Ridenour | June 14, 1949 |
| 2,515,248 | McCoy | July 18, 1950 |